UNITED STATES PATENT OFFICE.

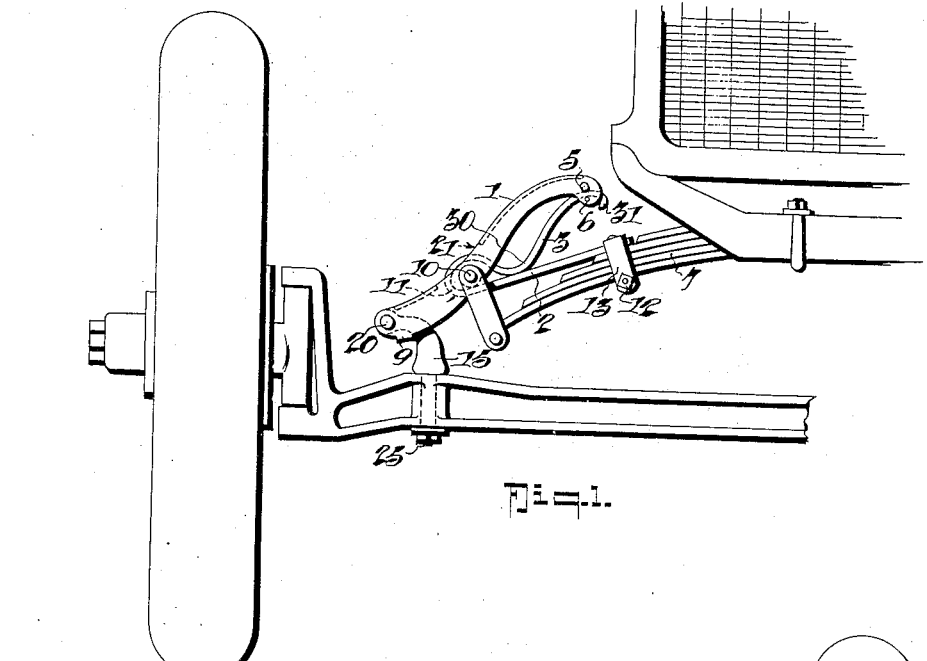
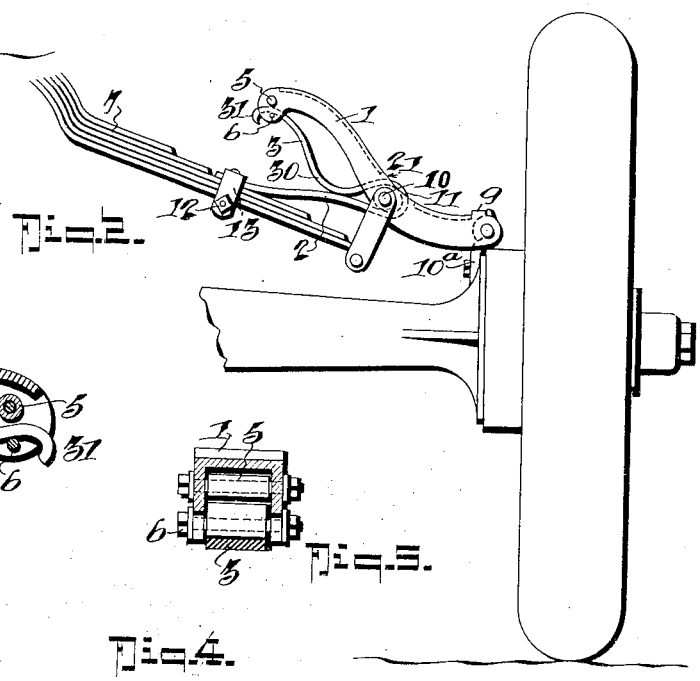
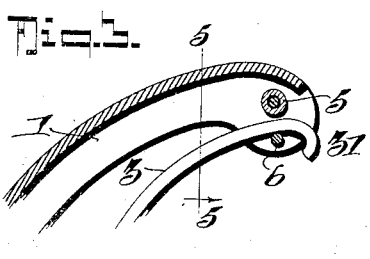
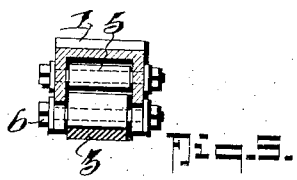
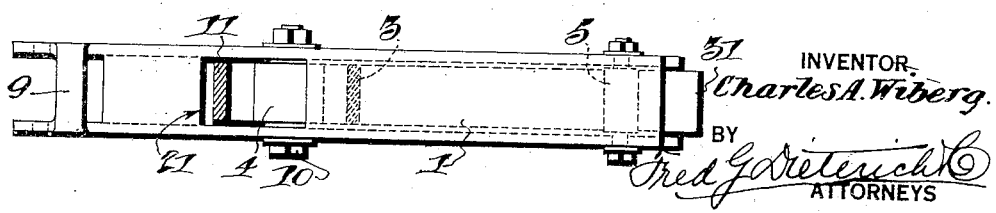

CHARLES A. WIBERG, OF DULUTH, MINNESOTA.

SHOCK-ABSORBER.

1,347,138.　　　　　　Specification of Letters Patent.　　Patented July 20, 1920.

Application filed November 11, 1919. Serial No. 337,144.

*To all whom it may concern:*

Be it known that I, CHARLES A. WIBERG, a citizen of the United States, residing at Duluth, in the county of St. Louis and State of Minnesota, have invented certain new and useful Improvements in Shock-Absorbers, of which the following is a specification.

My present invention has reference to spring suspension mechanisms, particularly adapted for use on motor vehicles and which especially relates to that type of spring suspension or shock absorbing devices disclosed in my Patents No. 1,319,937 and 1,319,938 dated October 28, 1919.

Primarily, my present invention has for its purpose to provide a shock absorbing means, of the general character stated, in which the auxiliary spring, and the connections that join it with the main leaf spring of a motor vehicle, are so arranged and combined with the said main spring and the vehicle axle, whereby a more compact and simplified arrangement of parts, constituting the shock absorbing means, is produced, and in which the said parts are coöperatively so disposed, with respect to each other, that the auxiliary spring devices have an easy and gentle movement, with respect to the main leaf spring, and the spring surface of the main spring is materially increased.

Again, my present invention comprehends, in a shock absorbing means of the general character mentioned, an improved arrangement of lever devices that connect with the axle perch and with the auxiliary spring, whereby a desired maximum cushioning effect is obtained and undue depressions and rebounds are effectively checked, with little or none of the objectionable sudden shocks frequently incident in the use of spring suspension absorbing mechanisms now in general use.

With other objects in view, that will appear in the following description, my present invention is a shock absorber that embodies the peculiar features of construction and novel arrangement of parts hereinafter explained in detail, specifically pointed out in the appended claims and illustrated in the accompanying drawings, in which:

Figure 1 is a front elevation of a portion of an auto vehicle and illustrates my improved shock absorber devices operatively combined therewith.

Fig. 2 is a rear elevation of a part of the rear axle, one of the vehicle wheels and my improved devices in operative connection therewith.

Fig. 3 is a detail longitudinal section of the upper end of the lever that is pivotally supported on the axle perch with which the auxiliary spring is slidably connected.

Fig. 4 is a plan view of the said lever, the upper portion of the auxiliary spring, and the spring guide members that coöperate with the said lever.

Fig. 5 is a detail cross section on the line 5—5 on Fig. 3.

In the drawing, I have illustrated but a single spring suspension or shock absorbing mechanism for the front end and one of such devices or mechanisms for the rear end of the vehicle.

In the practical application of my invention, there is one of said shock absorbing devices used at each end of the front and the rear axles.

In the practical development of my present invention, I employ a lever arm 1, which arm, as is clearly shown in Fig. 1, sustains the main and the auxiliary spring suspension members, the main spring 7 being of the conventional form and, in practice, attached to and supports the vehicle body in any approved manner.

The lever arm 1 is pivotally mounted, at its outer or lower end, on the perch 15, which is secured to the axle by the bolt connection 25, as shown.

The upper end of the perch 15 is angled and extends within the forked lower end of the lever 1, the latter being made fast to the perch by a bolt 20 which passes through the forked end of the lever which includes a crosswise extended radially projected lug 9 that constitutes a brace for the open or forked end of the lever and which also serves as a stop for engaging with the perch so as to limit the upward or rebound movement of the lever.

The lever 1 is U-shape in cross section so as to give room for free action of the auxiliary or suspension spring, presently again referred to and, at the top, the lever 1 has an elongated opening 21 that provides room for a roller bearing 4 that is rotatably mounted on a bolt 10 which takes through the opposite side members of the lever 1 and the roller 4, as is best shown in Fig. 4.

Auxiliary spring includes a lower upwardly bowed portion 2 whose free end is fixedly attached to and is held from slidable movement on the main spring 7 by a clip clamp 13 which passes over the free end of the lever portion 2 to which it is riveted or otherwise fastened.

12 designates the bolt that fixedly secures the clamp 13 in place on the spring 7.

The spring portion 2 extends outwardly and is looped back upon itself as at 11 over the roller bearing 4 and from the loop 11, it is bent downwardly to provide a bearing portion 30 that engages and is adapted for riding upon the spring member 2.

From the portion 30, the spring curves upwardly, as at 3, and has its free end held for slidable engagement with a roller bearing 5 that is transversely mounted in the upper inner end of the lever 1, a cross stud 6 secured in the said end of the lever, below the roller bearing 5, serving to guide the upper end of the spring membr 3, as the lever is swung down when the load depression extends the opposite ends of the main spring 7 and as the said upper end of the lever rises on the rebound.

The extreme upper end of the spring member 3 is bent to form a hook 31 whose purpose is to catch against the cross stud 6, when it has traveled back that far on the rebound of the spring devices.

From the foregoing taken in connection with the drawing, the complete construction, the manner of its operation and the advantages of my present construction of shock absorber will be readily apparent to those familiar with the use of motor vehicles.

By shaping the auxiliary spring and connecting it with the lever 1 and the main spring 7, as shown and before described, the lower part of the said auxiliary spring does not move back and forth on the main spring 7 and is held to the desired position at the upper end within the channel of the lever 1 and in position for permitting the necessary movement of the roller 4 within its loop portion.

The suspension of the main spring on the lever 1, which in turn is pivotally suspended on the axle perch 15 and the yieldable connection or suspension of the upper inner end 3 of the auxiliary spring, provides a very simple, compact and easily assembled arrangement of parts, that will not readily become disconnected or disabled, as the vehicle passes over the minor or the excessive unevenness of the road, the bar or stop 9 serving to limit the rebound action of the hook end 31 of the member 3 which operates to hold the suspension springs from excessive depressions.

While I have shown but one complete shock absorbing device constructed in accordance with my invention, as before stated, in practice, one of such devices is applied to each end of each wheel axle, the same as shown in Fig. 1, except, when applied to the rear axle, the lower end of the lever 1 is attached to a bracket having an apertured hub $10^a$ that is secured to the brake drum casing, as shown in Fig. 2.

What I claim is:

1. In a shock absorbing means for road vehicles, a fixed support on the vehicle, the main spring, an oscillating lever pivotally connected at its lower end to a fixed support on the vehicle and having means at the pivotal end for limiting its oscillation in one direction, a link connection that joins the outer end of the vehicle main spring and the lever, and an auxiliary looped spring, the loop of which engages the pivotal connection that joins the link and the lever, one end of the said looped spring having a fixed connection with the main spring and the other end of the said auxiliary spring having a slidable connection with the outermost end of the pivoted lever, the said outermost end of the lever and the free end of the spring that engages it having coöperating means to limit the rebound oscillation of the lever.

2. In a shock absorbing means for road vehicles, a fixed support on the vehicle, the main spring, an oscillating lever pivotally connected at its lower end to a fixed support on the vehicle and having means at the pivotal end for limiting its oscillation in one direction, a link connection that joins the outer end of the vehicle main spring and the lever, and an auxiliary looped spring, the loop of which engages the pivotal connection that joins the link and the lever, one end of the said looped spring having a fixed connection with the main spring and the other end of the said auxiliary spring having a slidable connection with the outermost end of the pivoted lever, the said outermost end of the lever and the free end of the spring that engages it having coöperating means to limit the rebound oscillation of the lever, the said coöperating means comprising a stud mounted on the said outer end of the lever and a hook portion on the upper end of the auxiliary spring adapted for engagement with the said stud on the rebound action of the shock absorbing devices.

3. The combination with the vehicle axle and the main spring that carries the vehicle body; of a lever pivotally joined at one end to a fixed support on the axle, a roller bearing in the upper outer end of the lever and a cross stud located below the said roller bearing and secured on the lever end, a roller bearing located on the lever near its pivotal end, a link connection that joins the roller bearing and the corresponding end of the vehicle main spring, an auxiliary lever looped upon itself, whereby to provide upper and lower auxiliary spring portions, the lower portion being fixedly attached to the main spring, the loop of the said spring passing over and adapted for engagement with the roller bearing with which the link connection joins, the upper portion of the said auxiliary spring passing between and having lengthwise slidable movement between the roller bearing and the cross stud on the upper end of the lever.

4. In a shock absorbing means for vehicles, the combination with the vehicle axle and the main spring on which the vehicle body is supported; of a lever pivotally connected at the lower end on a support on the axle to oscillate in the vertical plane, an auxiliary spring bent upon itself to constitute a loop, a roller bearing around which the loop passes, a link connection pivotally joined at its lower end to the corresponding outer end of the main vehicle spring and pivotally connected at its upper end with the lever and the roller bearing, the said auxiliary spring having its lowermost bent portion extended over and fixedly secured onto the main spring, the upper portion of the said spring being bent down from the looped part to bear upon the lower spring portion and then bent upwardly and outwardly with its outer or free end adapted for engaging the under side of the outer end of the lever.

5. In a shock absorbing means for vehicles, the combination with the vehicle axle and the main spring on which the vehicle body is supported; of a lever pivotally connected at the lower end on a support on the axle to oscillate in the vertical plane, an auxiliary spring bent upon itself to constitute a loop, a roller bearing around which the loop passes, a link connection pivotally joined at its lower end to the corresponding outer end of the main vehicle spring and pivotally connected at its upper end with the lever and the roller bearing, the said auxiliary spring having its lowermost bent portion extended over and fixedly secured onto the main spring, the upper portion of the said spring being bent down from the looped part to bear upon the lower spring portion and then bent upwardly and outwardly with its outer or free end adapted for engaging the under side of the outer end of the lever, and means at the said outer end of the lever coöperating with the corresponding end of the auxiliary spring to limit the rebound or upward oscillation of the lever, and means on the lower end of the lever coöperative with the bearing to which the said end of the lever is pivoted to limit the down or depression oscillation of the lever.

CHARLES A. WIBERG.